No. 11,692. Reissued Sept. 13, 1898.
M. FERNANDEZ.
CAR FENDER.
Application filed May 11, 1898.)
Fig. 1.
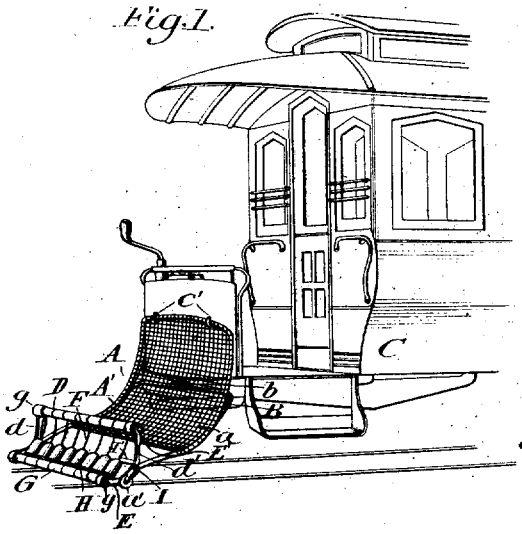
Fig. 2.
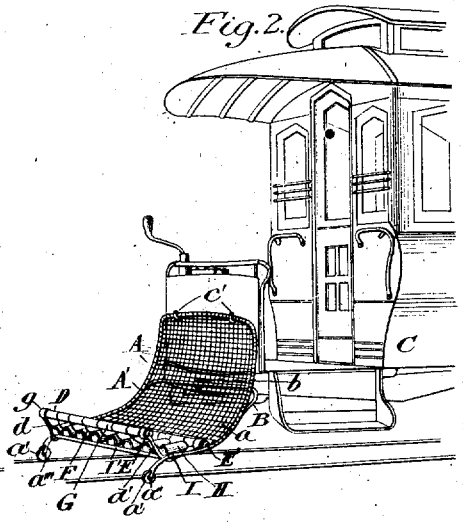
Fig. 5.
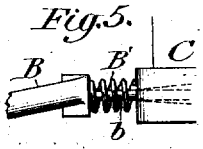
Fig. 3.
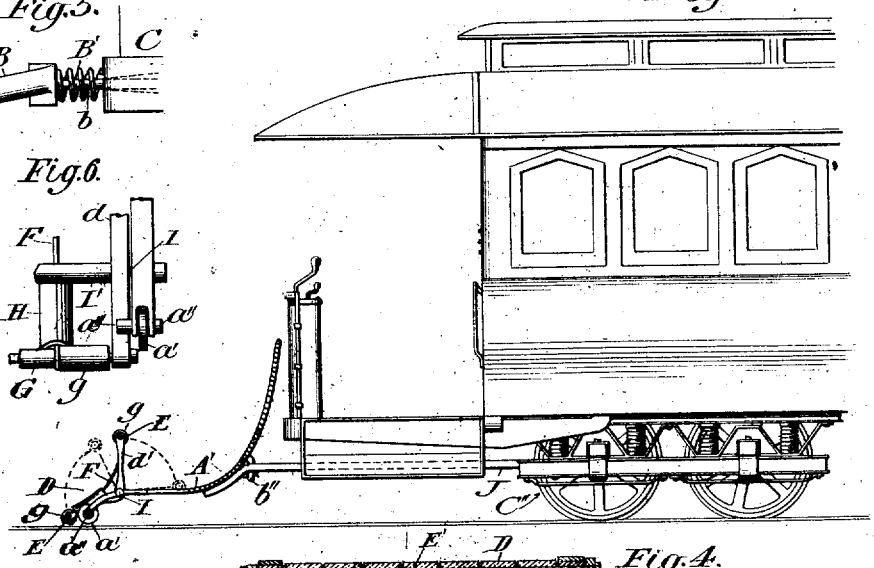
Fig. 6.
Fig. 4.
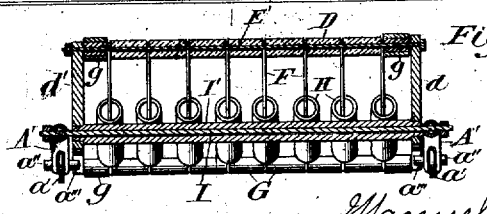
Witnesses:
Henry Kingman.
Geo. A. Johnson.
Inventor:
Manuel Fernandez
by Townsend Bros.
his attys.

UNITED STATES PATENT OFFICE.

MANUEL FERNANDEZ, OF LOS ANGELES, CALIFORNIA.

CAR-FENDER.

SPECIFICATION forming part of Reissued Letters Patent No. 11,692, dated September 13, 1898.

Original No. 590,187, dated September 14, 1897. Application for reissue filed May 11, 1898. Serial No. 680,427.

*To all whom it may concern:*

Be it known that I, MANUEL FERNANDEZ, a citizen of the United States, residing at Los Angeles, in the county of Los Angeles and State of California, have invented new and useful Improvements in Car-Fenders, of which the following is a specification.

My invention relates to those devices designed to be applied to electric or cable cars for the purpose of preventing persons struck by the cars from being thrown beneath the wheels, and thereby mangled.

In devices of this kind in which a receiver is secured upon the front end of the car it usually happens that a body struck by the car while in motion and thrown into the receiver will rebound therefrom and fall upon the track or be thrown into the street, causing injury to the person or loss of life.

Another great source of danger in devices of this kind is that a person struck by the fender as ordinarily constructed is liable to have his ankles broken by reason of the front end of the fender crowding downward under the strain and gripping the feet beneath the nose of the fender and sliding them along upon the ground. In case the feet strike an obstruction the ankles are certain to be broken.

The especial object of my invention is to provide a fender in which the weight of the body of the person struck by the fender will operate to lift the front end or nose of the fender and the feet of the person from the ground, thereby to avoid breaking or bruising the ankles or limbs, and yet to so arrange the device that there will be no liability of the nose of the fender elevating and allowing it to pass over the object instead of lifting it from the ground.

It is an object of my invention to provide a device of this kind which will have at its front end a yielding barrier adapted to be engaged and operated by the body of the person struck by the car to thereby be operated to raise the front portion of the fending device upward and to tilt the person into the receiver, the front portion of the fender then projecting upward to form a barrier which will prevent the body from rebounding or falling out of the receiver.

The scoop is trough-shaped and is pivoted at the apex of the trough to the receiver, and its rearward member is adapted and arranged to lie back upon the receiver when operated by a person caught by the scoop and to then form the floor of the front part of the receiver and to carry the person caught thereby.

My invention also comprises the peculiar construction of the scoop which is pivoted to the front end of the receiver, whereby the body struck by the fender is received upon sliding cushions which support the body and slide upward on guide-rods, receiving the friction and reducing the shock by allowing the body to slide to the rear upon the cushions and practically acquiring the velocity of the car, so that the body is projected into the receiver without liability of injury.

My invention comprises the various features of construction and combinations of parts hereinafter fully set forth and claimed.

The accompanying drawings illustrate my invention.

Figure 1 is a fragmental perspective view of one end of a car provided with my improved fender arranged in its normal position. Fig. 2 is a like view showing the fender in the position it assumes after it has been operated to tilt a body into the receiver. Fig. 3 is a side elevation of my improved fender secured to the trucks of a car to thereby cause the fender to follow the track in passing around curves. Fig. 4 is a longitudinal sectional view through the scoop and its pivotal support. Fig. 5 is a fragmental view illustrating the pivotal spring-support for the lower portion of the receiver. Fig. 6 is a fragmental view of the lower end of one of the arms of the receiver, showing the stop for the scoop.

My improved fender is not permanently attached to the car, but is arranged to be detached from one end of the car when the end of the line is reached and to be taken to the other end of the car and attached thereto by hooking it upon hooks secured to the end of the car. In this respect my improved fender is the same as that shown and described in Letters Patent No. 560,849, issued to me upon the 26th day of May, 1896.

In the drawings, A represents my improved fender, which is composed of an inverted-U-shaped frame, preferably formed of tubing to secure strength and lightness, the open mouth of the U being projected toward the front and the side members A′ being curved downward and forward. The frame of the receiver is provided with suitable netting *a*, preferably made of wire or other material which will not deteriorate by exposure to the weather.

B is a pivotal cross-brace rigidly secured to the side arms or members A′ of the frame and having near its mid-length a rearwardly-projecting pivot-pin *b*, which is adapted to enter an opening *c*, which is provided in the end of the car C.

*c′* are hooks secured to the dashboard or front of the car and upon which the cross-piece of the U-shaped fender is hooked. The front ends of the arms of the U-shaped frame are provided with bearing-wheels *a*, preferably formed of sheet metal of sufficient rigidity to withstand the strain, but thin in cross-section and loose upon their journals, so that the wheels will readily travel in between or around any stones which may be in the path or will cut into the ground in case the fender encounters an obstruction where there is no pavement.

D represents the tilting scoop or pivoted nose which is arranged at the front end of the receiver and pivoted between the side arms thereof. This scoop is formed of two end members *d d′*, which are curved and are connected together by tie-rods E E′, upon which are strung the looped ends of curved guide-rods F. Between the guide-rods I arrange short sections of rubber hose G, and the outer or corner sections *g* are made larger or more prominent in order to serve more effectually for fending. These fenders not only serve to prevent bruising the person struck by the fender, but further serve the purpose of holding the guide-rods F at the proper distance apart. Upon these curved guide-rods I arrange slidable cushions or fenders H, which may be each composed of a short length of rubber hose arranged to slide freely back and forth upon the rods. The scoop is pivoted between the side members of the receiver by means of a pivot-rod I, which extends through a sleeve I′, arranged between the side members of the scoop, so that the sleeve holds the side members of the scoop the proper distance apart, and the sleeve and pivot-rod also serve as a brace and tie for the front end of the receiver. The guide-rods F are curved toward the rear near their mid-length, but a sufficient space is left between the rods and the sleeve I′ to allow the slidable cushions to slide freely therepast. The pivots *a″* of the bearing-wheels *a′* are arranged with a head *a‴*, projecting into the path of the side arms A′ of the scoop to hold the scoop in proper position when the car is traveling forward—that is to say, with the front end of the scoop clearing the ground in sufficient distance to avoid encountering low obstructions. It will thus be seen that the forwardly-projecting nose or member of the scoop forms an inclined receiving-platform in front of the pivotal support of the scoop, upon which platform the body of the person struck is received, and the body slides upward along such platform upon the sliding fenders.

B′ is a spring which is arranged encircling the pivot-pin *b* and adapted to rest against the front end of the car C, and to thereby hold the front end of the fender elevated, but to allow it to tilt downward to cause the bearing-wheels *a′* to rest upon the ground or the track, as the case may be, whenever a heavy body is projected into the receiver. Under ordinary circumstances the bearing-wheels *a′* are held clear from contact with the ground or track.

The scoop is pivoted below its mid-line, so that thereby any force applied to the upwardly-projecting member of the scoop, which projects upward above the plane of the lower member, which forms the receiving-platform, and therefore will have a leverage against the lower member thereof and operate to lift such member, with its load, from the ground.

I am aware that it is old to pivot a tilting barrier to the front of a fender, so that such barrier will tilt downward against or upon the fender when an object is struck. My invention is distinguished from such devices in that I employ a scoop the nose of which projects in front of its pivotal point sufficiently to form a scoop upon which the weight of the object struck first rests, it then gradually sliding backward and upward into the scoop until it rests against the upper portion thereof, whereupon the scoop is tilted and the front portion is raised into a substantially vertical position to form a barrier sufficiently high to insure that the person within the receiver shall not roll therefrom onto the track. A slight curve given to the front of a tilting nose, as has heretofore been proposed, will not accomplish this end, and I do not claim such construction. My claims do, however, broadly embody a "scoop" which is pivoted at the rear of its nose and the nose of which projects sufficiently far in front of the pivotal point to form a rest or support upon which the body is received and by the tilting of the scoop is lifted clear from the ground and discharged into the receiver.

In practice the device is arranged as shown in Figs. 1 and 3, and if any person is struck while standing upon the track the front and lower portion of the scoop first engages the lower part of the limbs, knocking the person off his feet and throwing him toward the car. The natural impulse is to kneel down, and the knees of the person are thus brought into contact with the sliding cushions, which yield and slide upward to a point above the pivotal point of the scoop, tilting the upper end of the scoop toward the rear and elevating the front and lower portion of the scoop from the ground, thus lifting the feet of the person struck from the ground and avoiding any liability of crushing the ankles by reason of the feet being caught beneath the fender. The body is thus projected into the receiver, the upper portion of the fender tilting downward and forming a portion of the bottom of the receiver, upon which portion the body of the person naturally rests, thus holding the front portion of the scoop in position to form a barrier which will prevent the body from rebounding or falling out of the receiver.

In Fig. 3 of the drawings I have shown my improved fender attached to cross-bars J, which are secured to the trucks C″ of the car and project outward in front of the dashboard. The fender is secured to such bars by means of pins $b''$, passing downward through the bars and secured by a cotter-key or any other suitable means.

When the end of the line is reached, the motorneer disengages the fender from the end of the car and, wheeling it upon the supporting-wheels $a'$, transports it to the other end of the car, to which it is attached, and the car is ready for the return trip.

It will be noted that in case the fender strikes a body lying upon the track the front of the scoop first engages the body and by reason of the strain compresses the spring B′, and thus crowds the front end of the scoop down beneath the body; but as soon as the weight rests upon the sliding cushions the body and the cushions slide to the rear and the scoop tilts, placing the body in the receiver, while the body itself, resting upon the upper portion of the scoop, holds the lower half of the scoop up in front of the receiver to form a barrier which holds the body from rebounding onto the track.

It will be observed that the construction is one of great simplicity and cheapness, and on account of the lightness of the device one fender serves for both ends of the car, the motorman easily transporting the fender from one end of the car to the other and the attachment and detachment being easily and quickly effected.

Now, having described my invention, what I claim as new, and desire to secure by Letters Patent, is—

1. In a car-fender, the combination set forth of a receiver having its front end arranged in substantially a horizontal plane; and a trough-shaped scoop pivotally secured to the front end of the receiver by a pivot at the apex of the trough, said trough having one member normally projecting forward to form an inclined receiving-platform, and having its other member normally projecting upward above the plane of the receiving-platform; but when tilted forming the front floor of the receiver while the front member of the scoop forms a barrier at the front end of the receiver substantially as set forth.

2. In a car-fender, the combination set forth of a receiver and a tilting trough-shaped scoop pivoted to the front end of the receiver and having one member normally projecting forward to form an inclined receiving-platform, and having its other member normally projecting above the plane of the platform to form a yielding barrier at the front end of the receiver, and adapted and arranged to tilt back to rest upon the receiver to constitute the floor thereof to form a support for the body when such barrier is tilted downward into the receiver, and to thereby hold the other portion of the scoop rigidly in position to form a barrier at the front end of the receiver to hold the body therein.

3. In a car-fender, the combination set forth of a receiver; a tilting trough-shaped scoop pivotally secured to the front end of the receiver and provided with a forwardly-projecting nose forming an inclined receiving-platform, and also provided with a member projecting upwardly above the plane of the platform and adapted to tilt the scoop to raise the front member of the scoop to form a barrier to retain a body in the receiver.

4. In a car-fender, the combination set forth of a receiver; a tilting scoop pivotally secured to the front end of the receiver by a pivot arranged below the mid-line of the scoop, such scoop being provided with curved rods and sliding fenders arranged on the rods.

5. In a car-fender, the combination set forth of the fixed supporting-rods and sliding fenders arranged on top of the rods, to slide back and forth therealong.

6. In a car-fender, the tilting scoop having rearwardly-curved guide-rods and sliding cushion-fenders arranged on the rods.

7. In a car-fender, the combination of a receiver; a tilting scoop pivoted to the front end of the receiver and provided with guide-rods and sliding cushion-fenders arranged upon the rods.

8. In a car-fender, the combination set forth of a receiver; a tilting scoop pivoted to the front end of the receiver and provided with rearwardly-curved guide-rods; and cushion-fenders arranged to slide back and forth on the rods.

9. In a car-fender, the combination set forth of a receiver; a tilting scoop pivoted to the front end of the receiver by a rod extending from side to side of the receiver, and provided with guide-rods curved toward the rear and arranged in front of the pivotal rod; and sliding cushion-fenders arranged on the guide-rods.

MANUEL FERNANDEZ.

Witnesses:
ALFRED I. TOWNSEND,
F. M. TOWNSEND.